United States Patent
Clark et al.

(10) Patent No.: US 12,024,875 B2
(45) Date of Patent: Jul. 2, 2024

(54) MULTI-FUNCTIONAL CONNECTOR

(71) Applicants: MOONSHINE INVESTMENT HOLDINGS LIMITED, Halifax (GB); ELLIOTT GROUP LIMITED, Peterborough (GB); MCAVOY GROUP LIMITED, Lisburn (GB)

(72) Inventors: David Clark, Belfast (GB); Anthony Illingsworth, Peterborough (GB); Richard Crosby, Wakefield (GB); James Cowell, Worcester (GB); Chris Hoggarth, York (GB); Martin Harvey, Dungannon (GB)

(73) Assignees: MOONSHINE INVESTMENT HOLDINGS LIMITED, Halifax (GB); ELLIOTT GROUP LIMITED, Peterborough (GB); MCAVOY GROUP LIMITED, Lisburn (GB)

( * ) Notice: Subject to any disclaimer, the term of this patent is extended or adjusted under 35 U.S.C. 154(b) by 235 days.

(21) Appl. No.: 17/625,933

(22) PCT Filed: Jul. 9, 2020

(86) PCT No.: PCT/IB2020/056486
§ 371 (c)(1),
(2) Date: Jan. 10, 2022

(87) PCT Pub. No.: WO2021/005561
PCT Pub. Date: Jan. 14, 2021

(65) Prior Publication Data
US 2022/0243454 A1 Aug. 4, 2022

(30) Foreign Application Priority Data
Jul. 9, 2019 (GB) ..................... 1909855

(51) Int. Cl.
*E04B 1/24* (2006.01)
*E04B 1/38* (2006.01)

(52) U.S. Cl.
CPC ............ *E04B 1/2403* (2013.01); *E04B 1/388* (2023.08); *E04B 2001/2415* (2013.01); *E04B 2001/389* (2023.08)

(58) Field of Classification Search
CPC ................... E04B 1/2403; E04B 1/388; E04B 2001/2415; E04B 2001/246;
(Continued)

(56) References Cited

U.S. PATENT DOCUMENTS

| 682,621 | A | * | 9/1901 | Humphrey | ............. A47B 47/03 217/69 |
| 1,129,658 | A | * | 2/1915 | Foy | ......................... E04G 17/14 249/188 |

(Continued)

FOREIGN PATENT DOCUMENTS

| CN | 205604471 U | 9/2016 |
| CN | 108360683 A | 8/2018 |

(Continued)

OTHER PUBLICATIONS

United Kingdom Search Report dated Sep. 23, 2019 for corresponding United Kingdom Application No. 1909855.7, filed Jul. 9, 2019.
(Continued)

*Primary Examiner* — Theodore V Adamos
(74) *Attorney, Agent, or Firm* — David D. Brush; Westman, Champlin & Koehler, P.A.

(57) ABSTRACT

An assembly for offsite construction of a building, a connector for use in such an assembly, along with a method of manufacture of such a connector, and a method of construction using the assembly. The connector includes first and second buttress elements defining, respectively, a first loca-
(Continued)

tion portion and a second location portion. The first location portion and the second location portion are configured, respectively, to receive first and second structural elements extending at transverse angles to each other. The first and second buttress elements each has first and second opposite side walls defining an access space between them for a connector to be accessed. The second side wall of the first buttress element and the second side wall of the second buttress element together define a third location portion configured to receive a third structural element extending transversely to the first and second structural elements.

19 Claims, 11 Drawing Sheets

(58) Field of Classification Search
CPC ..... E04B 2001/2418; E04B 2001/2421; E04B 2001/2451; E04B 2001/389; E04B 1/3483; F16B 2200/67; F16B 7/185; F16B 7/0486; F16B 12/50
See application file for complete search history.

(56) References Cited

U.S. PATENT DOCUMENTS

| | | | | |
|---|---|---|---|---|
| 2,168,911 | A * | 8/1939 | Meyer | A47F 5/005 403/205 |
| 3,824,750 | A * | 7/1974 | Antoniou | E04B 1/3483 52/223.4 |
| 4,267,682 | A * | 5/1981 | Fowler | E04B 1/08 403/231 |
| 4,758,111 | A * | 7/1988 | Vitta | E04B 1/34315 52/646 |
| 4,910,939 | A * | 3/1990 | Cavanagh | E04B 1/2604 403/171 |
| 5,170,977 | A * | 12/1992 | McMillan | E04B 1/2608 52/712 |
| 5,259,685 | A * | 11/1993 | Gilb | E04B 1/26 403/231 |
| 5,349,800 | A * | 9/1994 | Peng | E04B 9/18 403/174 |
| 6,004,063 | A * | 12/1999 | Adams, Sr. | E04G 1/10 403/205 |
| 6,247,869 | B1 * | 6/2001 | Lichvar | F16L 47/00 403/403 |
| 6,974,276 | B2 | 12/2005 | Kirchner et al. | |
| D756,202 | S * | 5/2016 | Leduc | D8/354 |
| 10,090,651 | B2 * | 10/2018 | Broemstrup | H02B 1/30 |
| 10,458,114 | B2 * | 10/2019 | Lestini | E04H 1/005 |
| 2004/0001739 | A1 | 1/2004 | Kirchner et al. | |
| 2018/0135295 | A1 * | 5/2018 | Bowron | E04B 1/2604 |

FOREIGN PATENT DOCUMENTS

| | | | | |
|---|---|---|---|---|
| DE | 202016006174 | U1 | 12/2016 | |
| EP | 2543894 | A1 * | 1/2013 | ........... F16B 7/0486 |
| GB | 2586007 | A | 2/2021 | |
| GB | 2586007 | B | 12/2023 | |
| JP | 2004092241 | A | 3/2004 | |
| JP | 2014040737 | A | 3/2014 | |
| KR | 20100001559 | U * | 2/2010 | |
| KR | 20120125751 | A * | 11/2012 | |
| KR | 20170136042 | A * | 12/2017 | |
| KR | 20190101149 | A * | 8/2019 | |
| WO | 0223053 | A1 | 3/2002 | |
| WO | WO-2017027965 | A1 * | 2/2017 | ........... E04B 1/1903 |
| WO | WO-2020065474 | A1 * | 4/2020 | ......... A47B 47/0008 |

OTHER PUBLICATIONS

International Search Report dated Oct. 14, 2020 for corresponding International Application No. PCT/IB2020/056486, dated Jul. 9, 2020.
Written Opinion of the International Searching Authority dated Oct. 14, 2020 for corresponding International Application No. PCT/IB2020/056486, filed Jul. 9, 2020.
First Chinese Office Action dated Feb. 15, 2023 for corresponding Chinese Application No. 2020800625177.
Second Chinese Office Action dated Sep. 4, 2023 for corresponding Chinese Application No. 2020800625177.

* cited by examiner

Figure 9
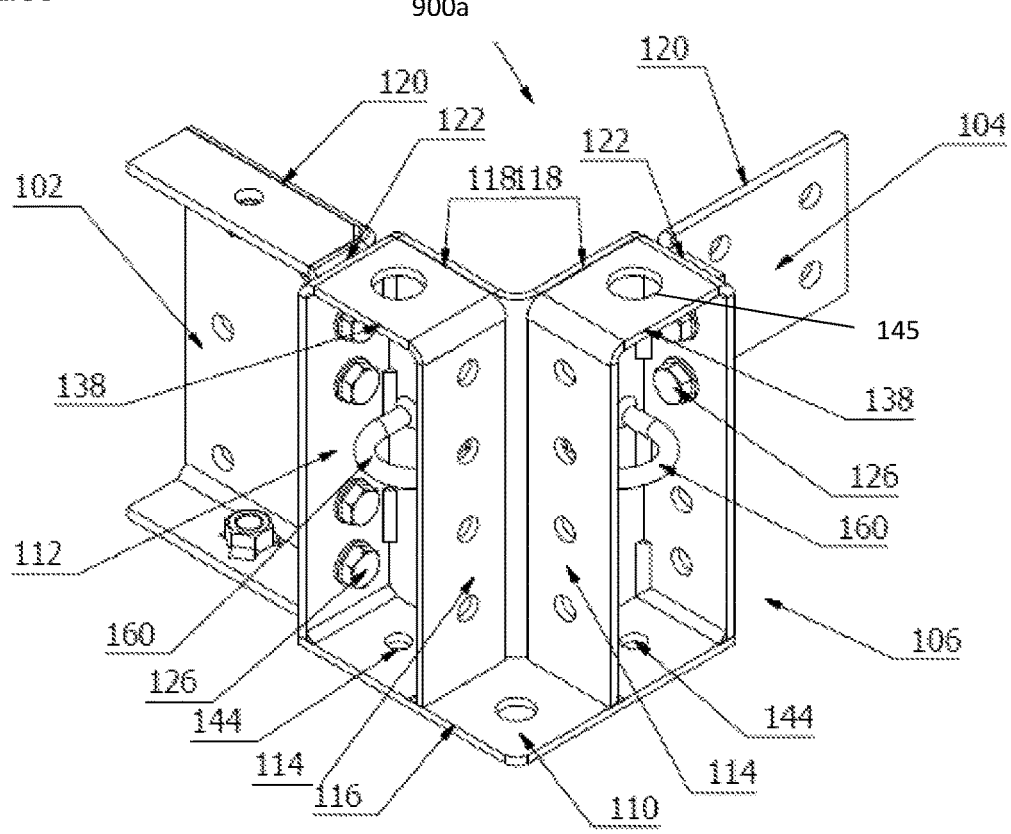
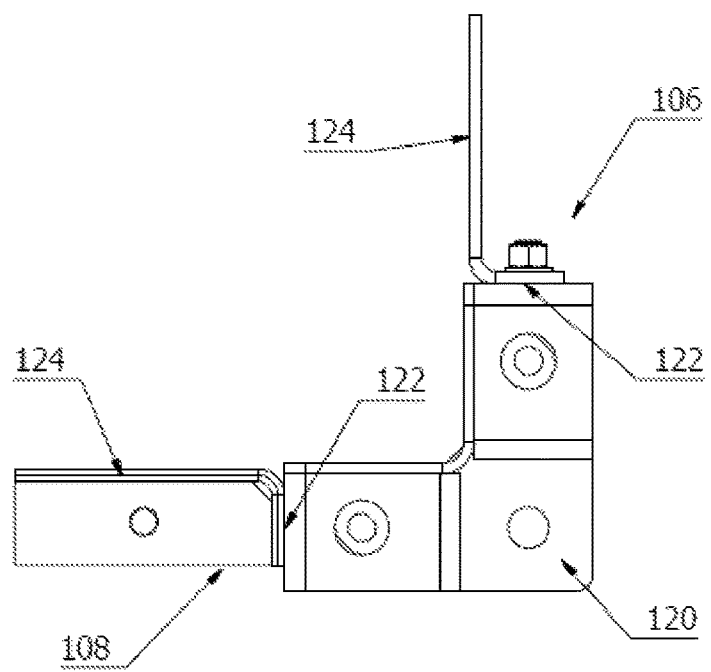
Figure 10

MULTI-FUNCTIONAL CONNECTOR

CROSS-REFERENCE TO RELATED APPLICATIONS

This Application is a Section 371 National Stage Application of International Application No. PCT/IB2020/056486, filed Jul. 9, 2020, which is incorporated by reference in its entirety and published as WO 2021/005561 A1 on Jan. 14, 2021, in English.

FIELD OF THE DISCLOSURE

The present invention relates to a system for offsite construction of a building. A connector for use in such a system is also disclosed, along with a method of manufacture of such a connector and a method of construction using the system.

BACKGROUND OF THE DISCLOSURE

It is increasingly desirable to accelerate the construction of buildings by providing prefabricated parts that can be manufactured off-site in a factory before being delivered to a construction site and assembled into a complete building. Such prefabricated buildings have distinct advantages in that the time of construction of the building is minimised and that, by using a common set of parts for many different buildings, the manufacturing costs can be minimised. These construction methods may be particularly useful in government-built buildings, such as schools, whereby the practicality and cost of construction are often two of the most important features of the building specification.

Uniformity of parts also allows a single specification to be used in multiple different buildings. For example, it may be advantageous to provide each component of a building—i.e. struts, connectors, flooring, walls, etc.—with a single shape, size, thickness, or other property. In this way, the manufacture of buildings can truly be optimised.

In order to further streamline the manufacture and assembly process, it may be desirable to provide a limited number of components that can be used in many different ways and/or accomplish multiple tasks.

SUMMARY

According to a first aspect, there is provided a connector block for offsite construction of a building, comprising:

a first buttress element and a second buttress element defining a first location portion and a second location portion, respectively, the first location portion and second location portion being configured to receive first and second structural elements extending at transverse angles, preferably right angles, to each other;

the two buttress elements together defining a third location portion configured to receive a third structural element extending orthogonally to the first and second structural elements.

The connector block is therefore capable of providing orthogonal connection of up to three orthogonal structural elements. This allows the connector block to function as a corner piece within various forms of offsite construction technologies such as:

3D Primary structural system, a systemised approach based on volumetric construction involving the production of three-dimensional units in controlled factory conditions prior to final installation.

2D Primary structural systems, a systemised approach using flat panel units used for basic floor, wall and roof structures of varying materials which are produced in a factory environment and assembled at the final work face to produce a final three-dimensional structure.

non-systemised primary structure, use of pre-manufactured structural members that are not substantially in-situ workface constructed and are not part of a systemised design The connector block may comprise a base plate that forms a base of each buttress element and interconnects the buttress elements.

The base plate therefore not only provides additional strength and/or rigidity to the buttress elements, but also acts to interconnect the buttress elements such that they are braced against each other.

The base plate may define a part of the third location portion, for example a base of the third location portion.

The base plate can therefore help to position a structural element within the location portion and/or to provide an area to which the structural element can be fixed, once positioned.

The base plate may include an aperture defining a lifting point for the connector block.

The lifting point may be used to attach fixations in order to position the connector block during construction. This may be useful both prior to connection of any structural elements as well as when the connector block has been attached to structural elements and therefore forms a part of a larger module or structure.

The connector block may comprise at least one attachment element, each attachment element being configured to connect to one of the first buttress element and the second buttress element in a selected one of two orientations, each attachment element being configured to provide a connection between one of the buttress elements and a structural element.

The use of attachment elements can enhance the connection between the buttress elements and structural elements to which they are attached.

The attachment elements may be L-shaped or substantially L-shaped. This means that the attachment provides by the attachment elements to the structural elements can be on a different side of the structural than would otherwise be possible when connecting the structural element directly to the buttress elements.

The attachment elements may include multiple attachment faces. Where the attachment elements are L-shaped, there may be two attachment faces positioned at right angles to one another. Each attachment face may include holes for receiving connectors to attach the attachment element to a buttress element and/or structural element. An attachment face configured to connect to a structural element may include more holes than an attachment face configured to connect to a buttress element. For example, an attachment face configured to connect to a structural element may include four holes and these four holes may be in a rectangular arrangement, and an attachment face configured to connect to a buttress element may include three holes and these three holes may be in a linear arrangement.

An attachment face configured to connect to a structural element may have a larger area than one configured to connect to a buttress element, for example it may be twice as large or approximately twice as large. This may give greater stability to the connection.

The buttress elements may include holes for receiving connectors to connect to attachment elements and/or structural elements. These holes may be configured to align with corresponding holes in the attachments elements and/or structural elements.

The connectors may be bolts.

The holes may include integrated nuts configured to engage with the bolts. By providing integrated nuts, the connection of bolts may be made simpler, for example being connectable using a single tool.

Each buttress element may include a locator for locating attachments on the connector block. Attachments may include brackets, locating pins or lifting and handling equipment.

The locator may comprise a locator tube formed between a top surface and a bottom surface of the connector tube. The locator tube may provide a simple connection for attachments.

The locator tube may be open at an upper end and at least partially closed at a lower end.

Each locator tube may be at least partially closed at the lower end by the base plate of the connector block.

The connector block may further comprise a support plate that is positioned within each buttress element for supporting the locator tube part way along a length of the locator tube.

The support plate may not only provide support for the locator tube, preventing movement or misalignment thereof, but may also provide strengthening or enhanced rigidity of the buttress element within which it is positioned.

The connector may comprise a U-bracket to provide a connection point for safe manual handling of the connector or assembled structural elements. The U-bracket may be used for guiding structural elements into position using ropes, wires, straps and handling poles or as means of securing 3D or 2D assemblies to delivery vehicles to ensure safe transportation.

Each buttress element may include two opposing side walls, one of the said opposing side walls defining the first location portion and the other of the said opposing side walls defining a part of the third location portion.

Each buttress element may include a third side wall that interconnects the opposing side walls.

The presence of a third side wall may provide additional strength and/or rigidity each buttress element. Access to the interior of the buttress element may be ensured by not providing a fourth side wall.

Each third side wall may be positioned on an interior side of the connector block.

By positioning the third side wall on the interior side, the exterior side can remain open for easy access to the interior of the buttress elements, for example for accessing connections or passing through wiring.

The connector block may be L-shaped or substantially L-shaped. This shape may provide strength to the connector block whilst ensuring that the structural elements can be attached in the correct orientation. Moreover, an L-shaped connector block may be orientated in different ways depending on which vertex of a module it is to be attached.

The connector block may be formed from a plurality of plates.

The plates may be metal plates, such as steel or any other suitable metal.

The plates may have a single gauge or thickness.

The buttress elements may be formed from box section, which may be a standard box section.

The plates may be bent into shape before being assembled to other plates of the connector block.

The plates may be engaged by way of at least one mortise and tenon joint. These may provide good strength to the connector block whilst keeping the structure simple.

Additionally or alternatively, the plates may be welded together. Welding may enhance the strength of connection of the plates. The plates may be solely welded together, without other forms of joints. Alternatively, the connector may be formed using a single form of manufacture such as a mould or casting.

The connector block may be unhanded, i.e. substantially symmetrical enabling a single connector to be used on left and right hand side of the structural assembly.

Similarly the connector block may be turned upside down, such that the base plate becomes a cap when used in a roof or ceiling assembly.

Additional integral nuts may be fixed to the connector block to suit specific site connection requirements, the base platform of the connector block is unaffected by the addition of additional integral nuts ensuring greater flexibility.

According to a second aspect, there is provided a system for offsite construction of a building, comprising:
  a plurality of structural elements;
  at least one connector block configured to interconnect the structural elements;
  wherein the at least one connector block is configured to provide a releasable connection between the plurality of structural elements in three orthogonal directions.

A simple, releasable, system is therefore provided for the offsite construction of buildings.

The releasable connection may be provided by connectors, such as bolts.

The bolts may be receivable by integrated nuts of each connector block.

By providing integrated nuts, the connection of bolts may be made simpler, for example being connectable using a single tool.

The connector block may be manufactured from a plurality of plates. The plates may be metal plates, such as steel or any other suitable metal.

Forming the connector block from a plurality of plates provides a simple and cost-effective method of providing a connector block.

The plates may be engaged by way of at least one mortise and tenon joint. These may provide good strength to the connector block whilst keeping the structure simple.

Additionally or alternatively, the plates may be welded together. Welding may enhance the strength of connection of the plates. The plates may be solely welded together, without other forms of joints.

The plates may have a single gauge or thickness.

The buttress elements may be formed from box section, which may be a standard box section.

The structural elements may comprise elongate members. The elongate members may take the form of beams or struts, and may be configurable to receive additional portions of the system.

The system may further comprise at least one floor portion, ceiling portion, and/or wall portion that connects to the structural elements to form a floor, ceiling, and or wall.

The system can therefore provide complete building modules, including structural elements, walls, floors, and ceilings. Individually or in groups, these building modules may form buildings.

According to a third aspect, there is provided a method of manufacturing a connector block according to the first aspect, the method comprising the step of:

forming the first buttress element and the second buttress element from a plurality of plates that engage together.

The plates may engage together using mortise and tenon joints. These joints can be formed in plate components simply and cheaply.

The method may include the further step of welding the plates together. This can provide additional strength to the connector blocks.

The method may include the further step of forming holes in the plates. The step of forming holes in the plates may be carried out prior to the step of forming the first buttress element and the second buttress element. Forming the holes prior to forming the buttress elements can simplify construction as all the holes can be formed when they are lying in the same plane, and so drilling or otherwise forming the holes in multiple different orientations can be avoided.

According to a fourth aspect, there is provided a method of constructing a structure using at least one connector block according to the first aspect, the method comprising:

connecting a plurality of structural elements together using the at least one connector block.

The method may further comprise connecting a first structural element to the first location portion and/or a second structural element to the second location portion of the at least one connector block.

The method may further comprise connecting a third structural element to the third location portion of the at least one connector block.

Prior to the connection of the first and second structural elements, the method may comprise the step of connecting an attachment element to at least one of the buttress elements of the at least one connector block, the attachment element connecting to the structural element.

The method may further comprise the step of connecting at least one floor portion, wall portion, or ceiling portion, to form a floor, wall, or ceiling, respectively.

BRIEF DESCRIPTION OF THE DRAWINGS

The present disclosure will now be discussed with reference to the accompanying drawings, in which:

FIGS. 9 and 10 show, respectively, perspective and plan views of a second type of connector in accordance with the disclosure.

DETAILED DESCRIPTION OF ILLUSTRATIVE EMBODIMENTS

Figure 1:
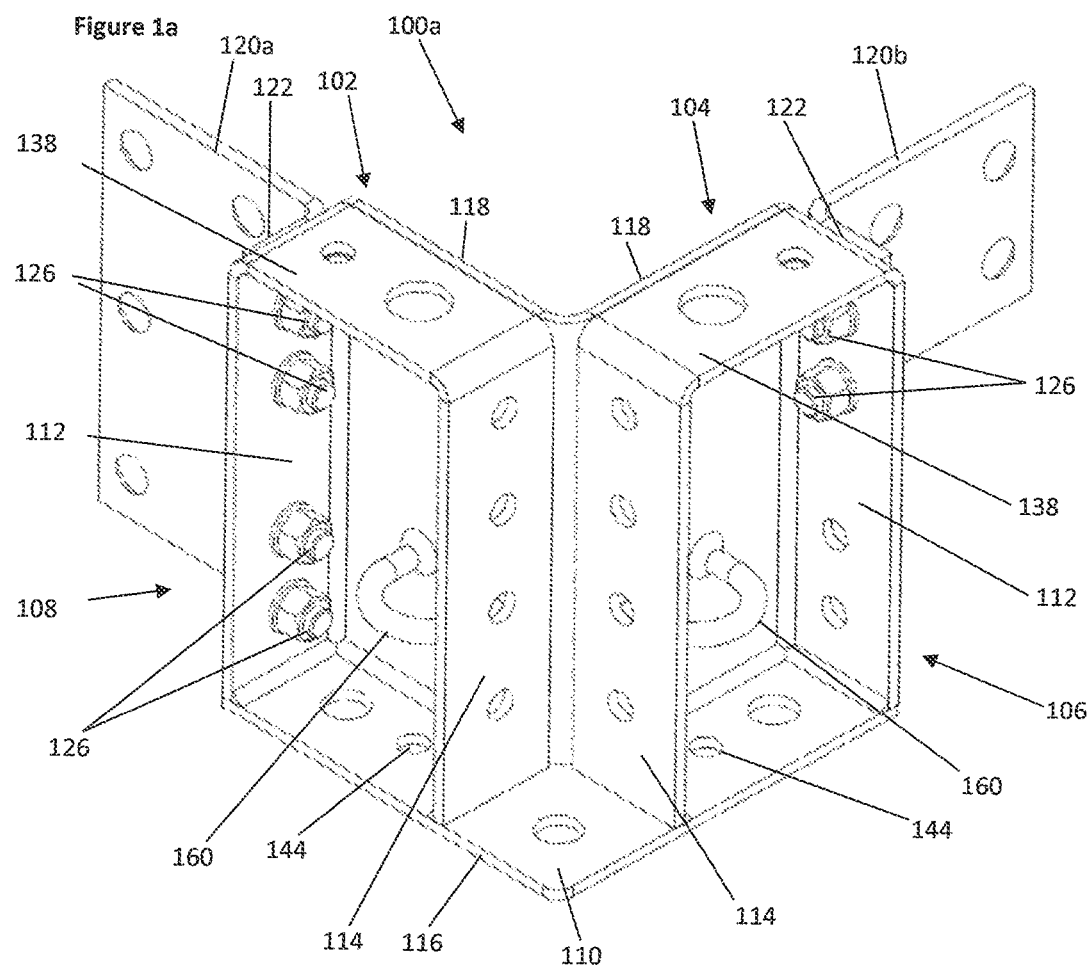
FIGS. 1a and 1b are perspective and plan views of a connector in accordance with the disclosure.
Figure 2:
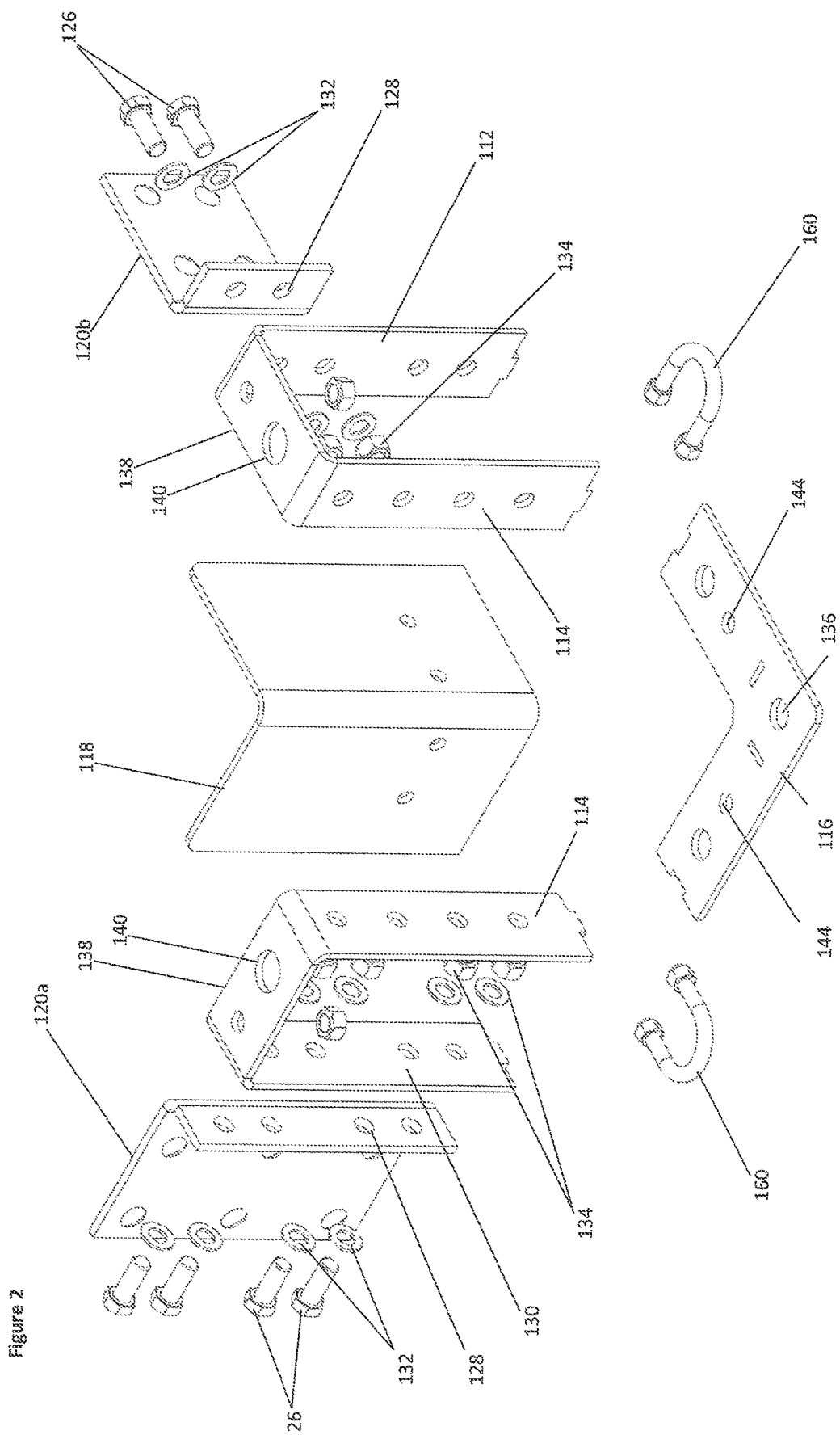
FIG. 2 is an exploded view of the connector of FIGS. 1a and 1b, showing all its component parts.

Referring firstly to FIGS. 1 and 2, there is shown a connector block 100a. The connector block 100a comprises a first buttress element 102 and a second buttress element 104 that respectively define a first location portion 106 and a second location portion 108. The first location portion 106 and second location portion 108 are positioned at right angles to one another such that they can receive first 1006 and second 1006 structural elements (refer to FIG. 4) that extend in orthogonal directions. The connector block 100a can therefore be used in a corner position in a building or a part of a building.

Together, the first and second buttress elements 102, 104 also define a third location portion 110 that is located between the first buttress element 102 and the second buttress element 104. This third location portion 110 is configured to receive a third structural element 1010 (refer to FIG. 4) that is orthogonal to the positions of the first and second structural elements. Thus, the connector block 100a can connect three structural elements together, therefore forming a vertex of a building or a part of a building.

As shown in FIGS. 1a and 1b, the first structural element will extend from the first buttress element 102 in a direction to the left of the first buttress element 102, the second structural element will extend from the second buttress element 104 in a direction to the right of the second buttress element 104, and the third structural element will extend upwards between the first and second buttress elements 102, 104. Of course, it may also be possible to connect structural elements in different orientations, if required.

Each buttress element 102, 104 comprises two opposing side walls 112, 114. An outer opposing side wall 112 defines or forms a boundary of the first or second location portions 106, 108, respectively, whilst an inner opposing side wall 114 of each buttress element 102, 104 defines or forms a boundary of the third location portion 110.

A base plate 116 is provided that both provides a lower wall to each of the first and second buttress elements 102, 104 and interconnects the two. The base plate 116 therefore assists in providing stability to the connector block 100a. The base plate 116 is substantially L-shaped, with a width that is equal or substantially equal to the width of the buttress elements 102, 104, forming a solid foundation for the buttress elements 102, 104.

Each buttress element 102, 104 also includes a third side wall 118. In the depicted embodiment, this third side wall 118 interconnects the two opposing side walls 112, 114 of each buttress element 102, 104 on an interior side of the L-shaped connector block 100a. The side of the buttress elements 102, 104 that is on an exterior side of the connector block 100a does not have a side wall, in order to allow access to the inside of each buttress element 102, 104. In alternative embodiments, it may be possible to include a removable side wall or a partial side wall such that access to the interior of the connector block 100a may be maintained.

For assisting with the connection of structural elements, the first and second location portions 106, 108 each include attachment elements 120a, 120b. The attachment elements 120a, 120b have an L-shaped cross-section and are releasably connected to a respective buttress element 102, 104. The L-shape allows the attachment elements 120a, 120b to simultaneously attach to the buttress element 102, 104 and to a structural element, each connection being made on a different face of the attachment element 120a, 120b. As the attachment elements 120a, 120b are releasably connectable to the buttress elements 102, 104, the attachment elements 120 may be of equal or different sizes and/or may be oriented in two different positions, dependent on the requirements of the connector block 100a, the two different positions being provided by rotation of a first face 122 of the attachment elements 120a, 120b, which connects to the buttress element 102, 104, by 180°.

By changing the connection positions of the attachment elements 120a, 120b, the position of a second face 124 of the attachment element 120a, 120b, which attaches to a structural element, can be altered. In doing so, the position of the structural element to which it attaches can be different. This may be particularly advantageous where multiple, adjacent, connector blocks 100a are required to attach to a single structural element.

It will also be apparent that the second face 124 of the attachment elements 120a, 120b is longer than the first face 122. This allows a stronger connection to be made to the structural elements, for example by providing a greater number of connectors, without requiring larger buttress elements 102, 104.

The attachment elements 120a, 120b are each attached to their respective buttress elements 102, 104 by way of connectors, such as bolts 126. It should be appreciated that the space defined between the buttress walls 112 and 114 creates space to fit bolts 126 into attachment elements 120a, 120b. In the depicted case, four bolts 126 are used to connect the attachment element 120a to the first buttress element 102 and two bolts 126 are used to connect the attachment element 120b to the second buttress element 104. This is because the attachment element 120a connected to the first buttress element 102 is larger in height than the attachment element 120b connected to the second buttress element 104. Of course, a greater or lesser number of bolts 126 may be used, depending on the strength of connection required, the size of the connector block 100a or attachment element 120a, 120b, and the size of the bolts 126 themselves.

Each bolt 126 passes through a hole 128 in the attachment element 128 and a hole 130 in the buttress element 102, 104. A washer 132 is provided between each bolt head and the attachment element 120. The nuts 134 that connect to each bolt 126 are, in the depicted embodiment, provided separately however they may be provided integrally as part of the buttress elements 102, 104, i.e. the nuts 134 are attached to or formed as part of, an inside surface of the outer side walls 112 of the buttress elements 102, 104. By providing the bolts 126 as integral with, or fixedly mounted to, the outer wall 112, the bolts 126 can be screwed into the nuts 134 without requiring the bolts 126 to be separately held, making attachment of the attachment element 120 simpler for the user.

As well as forming the lower boundary of the first and second buttress elements 102, 104, the base plate 116 provides a lower bound and definition of the third location portion 110. The base plate 116 therefore acts to provide stability to the connector block 100a in that it interconnects the two buttress elements 102, 104. In addition, acting as the lower boundary of the third location portion 110, it provides a base on which a structural element within the third location portion 110 may be seated.

In the present embodiment, the base plate 116 also includes an attachment point 136 in the form of an aperture. The attachment point 136 allows the connector block 100a to be connected to, for example, lifting equipment. When in position in a structure, this means that the connector block 100a and connected structural elements may be lifted easily for assembly or repositioning. Additionally or alternatively, the attachment point 136 may provide a point at which adjacent connector blocks 100a in an assembly may be joined together by a fastener such as a bolt or other suitable fastening means.

Each buttress element 102, 104 also includes a top plate 138 that interconnects each side wall, including the two opposing side walls 112, 114 and the third side wall 118. The top plate 138 includes an opening 140 to enable vertical connection between connector blocks 100a. It may also including a guiding tube, not shown in the present embodiment to assist in guiding the bolt into position. The locator tube would run from the top plate 138, in a plane parallel to the planes of the opposing side walls 112, 114, and terminate on the base plate 116. The locator tube would be seated on, and not pass through the base plate 116. However, a (small) aperture 144 is formed in the base plate 116 that allows access to the inside of the locator tube.

Figure 8:
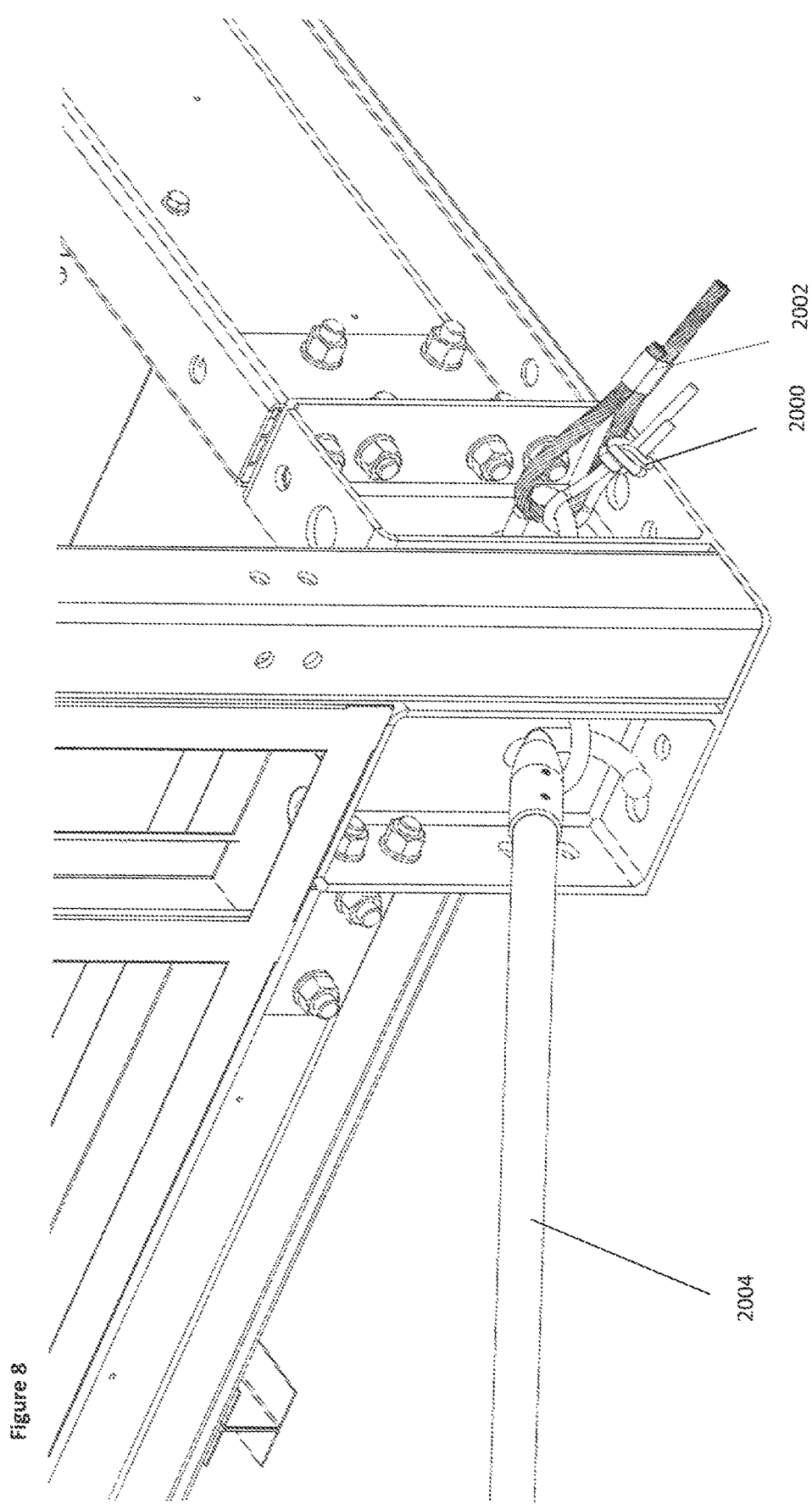
FIG. 8 shows a number of different attachments to the buttresses of a connector block of the present disclosure.

The connector may comprise a U-bracket 160 to provide a connection point for safe manual handling of the connector or assembled structural elements. The U-bracket may be used for guiding structural elements into position using various methods. As shown in FIG. 8, ropes 2000, wires 2002, straps (not shown) and handling poles 2004 are shown. The U-brackets may also or alternatively used as means of securing 3D or 2D assemblies to delivery vehicles to ensure safe transportation.

The connector block 100a is formed from a plurality of plates. The base plate 116 is flat, side walls 112, 114 and top plate 138 are formed together in a U-shape and the third side walls 118 form an L-shaped element. The U-shape and L-shape elements may be cast, machined or bent into shape from a flat blank. Providing these components as shaped elements ensures that manufacture of the connector block 100a is simple. Each of the elements 112, 114, 118 and 138 may be provided as flat plates and may be fabricated to form the overall connector block. The attachment elements 120 are L-shaped and may be cast or machined. However, the attachment elements 120 are preferably bent into shape from a flat blank, in order that the manufacturing process is further simplified.

Each of the plates is connected to others by a series of mortise and tenon joints. The plates therefore include protrusions and/or slots, which can engage in order to provide a mortise and tenon joint. Once in position, the plates may be welded together in order to provide additional strength and/or rigidity to the connector block 100a.

The connector block is unhanded, that is, it is symmetrical enabling a single connector to be used on left and right hand side of the structural assembly.

Figure 3:
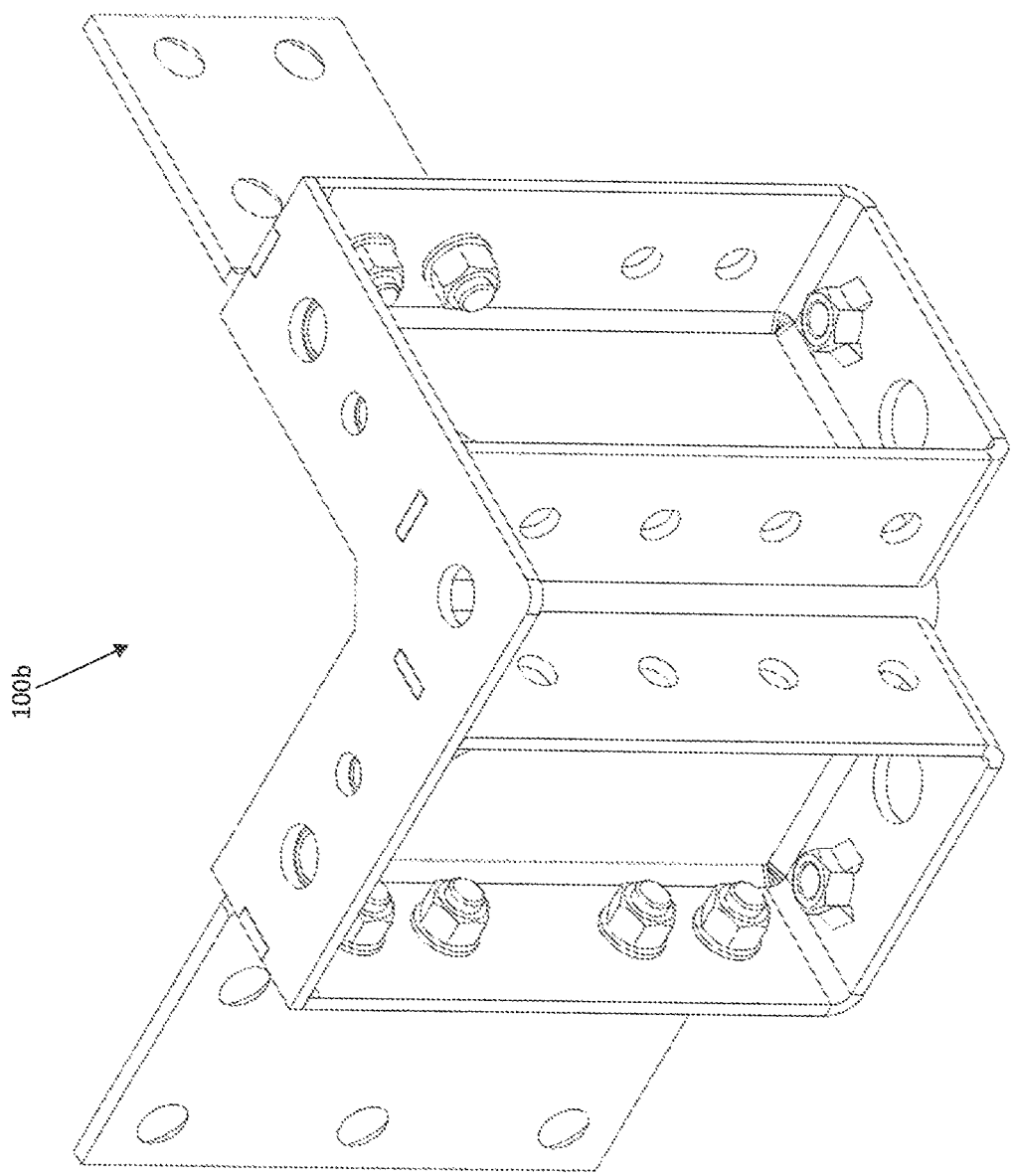
FIG. 3 is a perspective view of a connector in accordance with the disclosure in roof/ceiling orientation, i.e. inverted with respect to the connector of FIGS. 1a and 1b.

Similarly the connector block may be turned upside down 100b where base plate 116 now becomes the cap when used in a roof or ceiling assembly. This can be seen in FIGS. 3 and 4.

Additional integral nuts may be fixed to the connector block to suit specific site connection requirements, the base platform of the connector block is unaffected by the addition of additional integral nuts ensuring greater flexibility.

Figure 4:
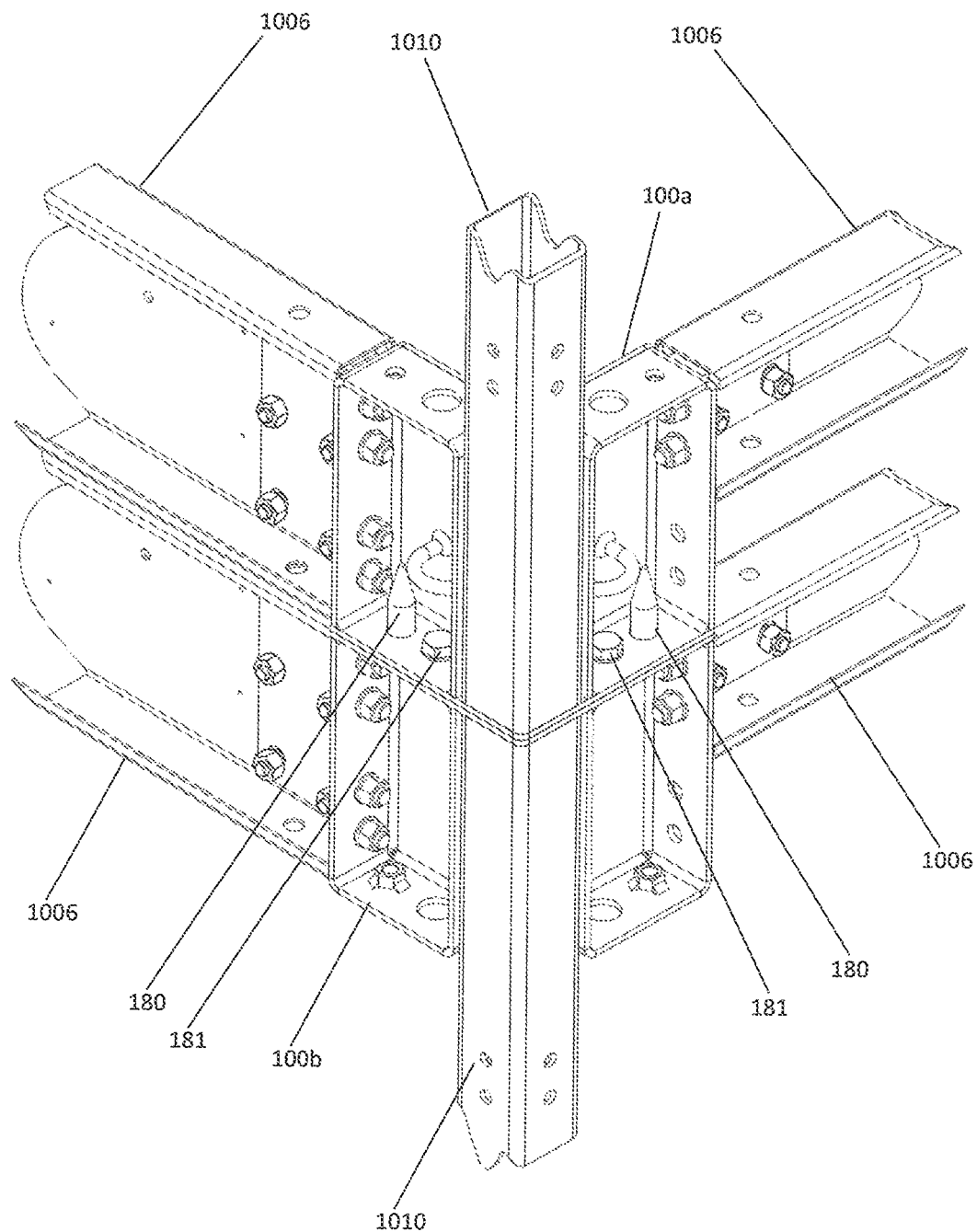
FIG. 4 is a perspective view of a pair of connectors in a part of a floor and roof assembly illustrating the additional structural members shown as an example of those which may be secured via the connector block.

With reference to FIG. 4, typical accessories are illustrated including a location pin 180 which could be fixed to the connector block 100b to allow vertical alignment and lateral restraint when connecting sub-assemblies. A bolt 181, arranged through apertures 144, provides positive vertical connection between connector blocks which could be used to prevent progressive collapse of a building. The examples illustrate the flexibility of the connector block and are not an exhaustive list of potential connection options.

The connector block 100a is designed to effectively distribute load from horizontal structural elements 1006 to the vertical structural elements 1010.

Figure 5:
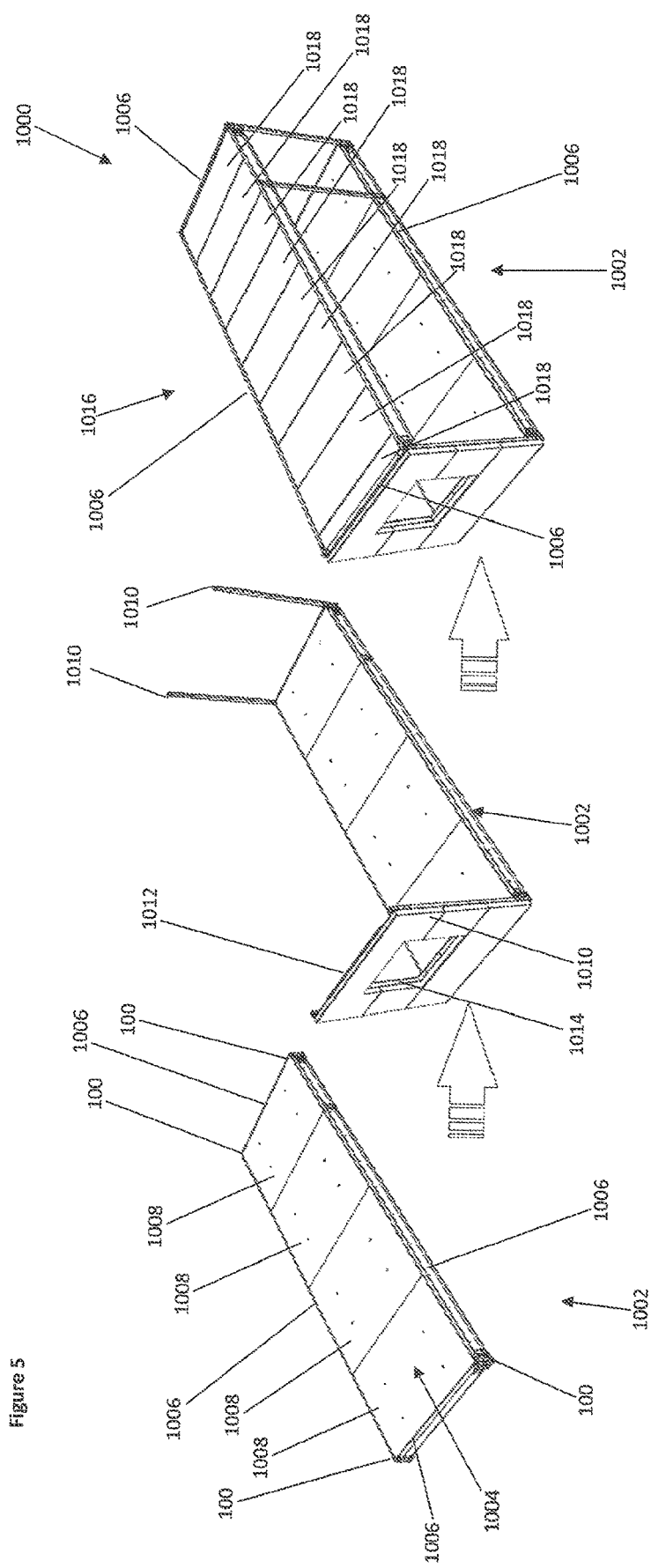
FIG. 5 shows three stages of construction of a building using a system in accordance with the disclosure.

An assembly 1000 is shows in FIG. 5. The leftmost picture shows a floor assembly 1002 that includes four connector blocks 100a, each provided at a corner of a floor 1004. Horizontal structural elements 1006 interconnect the connector blocks 100a using bolts, to form a rectangular structure. The horizontal structural elements 1006 are therefore attached to the first and second location portions 106, 108 of each connector block 100a. Floor sections 1008 are then provided. The floor sections 1008 are attached to the structural elements 1006. In the depicted floor assembly, four floor sections 1008 are provided, although a different number or different size of floor section may be provided, dependent on need. The structural elements 1006 may be formed of any structurally sound material, such as, for example, steel.

In the next stage, shown in the middle picture, four vertical structural elements 1010 have been attached to the connector blocks 100a. The vertical structural elements 1010 are fixed into the third location portions 110 of each connector block 100a by a plurality of bolts. On one end of the floor assembly 1002, a wall section 1012 is connected to both a horizontal structural element 1006 and two vertical structural elements 1010. The wall section 1012 includes a window 1014, although solid wall sections may instead be provided.

Finally, in the third stage, a ceiling assembly 1014 is attached to the four vertical structural elements 1010. The ceiling assembly 1014 includes nine ceiling sections 1016 that are supported by four horizontal structural elements 1006. The horizontal structural elements 1006 are interconnected in the same way as those described previously, with a connector block 100b forming each vertex of the ceiling assembly 1014. The connector blocks 100b of the ceiling assembly 1014 are inverted in comparison with those of the floor assembly 1002, such that the third location portions 110 of each connector block 100b can receive the vertical structural elements 1010.

The complete assembly 1000, including the floor assembly 1002, ceiling assembly 1014, and wall section 1012, can be attached by the connector blocks 100a, 100b to similar or identical assemblies. For example, the connector blocks 100a, 100b may be attached directly to other connector blocks 100a, 100b, such as using connectors through the holes or apertures in the connector blocks 100a, 100b, or may be attached directly to other structural elements 1006, 1010. In this way, the assembly 1000 can be part of a larger modular structure. The larger modular structure can form a building such as a residential building, a commercial building, or a civic building, such as a school.

Figure 6:
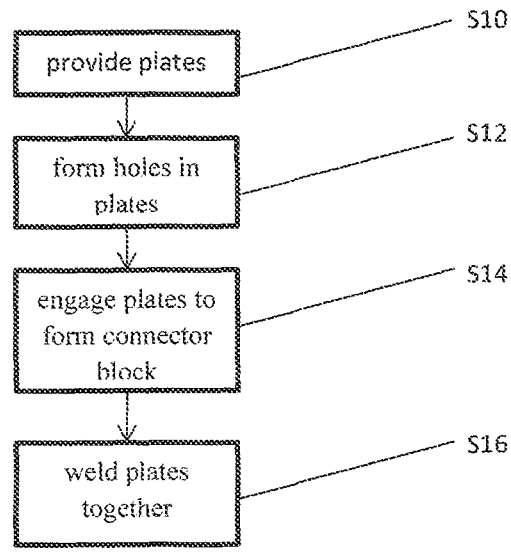
FIG. 6 is a flow chart showing the steps involved in a method of manufacture of a connector in accordance with the disclosure.

FIG. 6 shows a method of manufacture of a connector block as shown in FIGS. 1 and 2. In a first step S10, a plurality of plates are provided. These plates are shaped by any suitable method of manufacture in order that they are the correct shape to form the side walls, top plate, base plate, support plate, attachment element, or any other part of the connector block. The shaping of the plates will include any connection features such as the parts of the mortise and tenon joints shown in FIGS. 1 and 2.

The plates may be machined or otherwise processed in order to form holes in the plates in a second step S12. Advantageously, the forming of holes will be carried out prior to the assembly of the plates into the finished shape of the connector block 100, to simplify the manufacturing process. This step S12 follows the first step S10.

Once the plates have been manufactured, they are engaged together in order to form the shape of the connector block 100 in a step S14. The engagement of the connector blocks 100 shown in FIGS. 1a, 1b, and 2 is provided using mortise and tenon joints. If other types of joint are used in the connector block 100, the method will then include the engagement of the plates using whichever type of joint is provided for by the connector block. In order to ensure that the connections are made permanent, the plates of the connector block 100 of the present disclosure are also welded together along their edges. This is shown in the next step S16 of FIG. 6.

Figure 7:
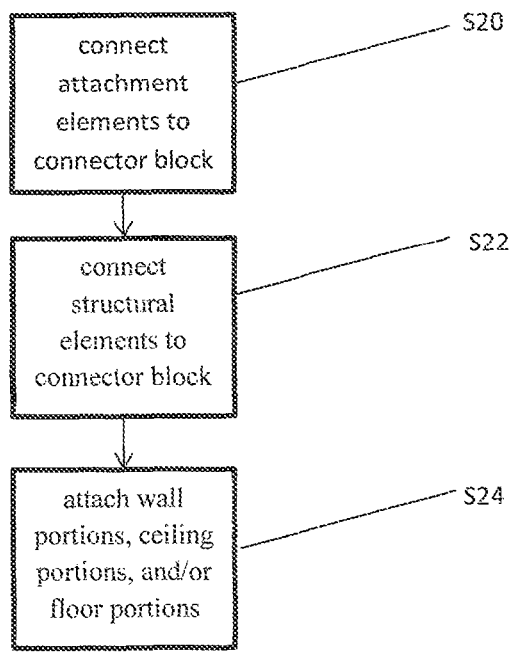
FIG. 7 is a flow chart showing the steps involved in a method of construction of a building using the system of the disclosure.

In FIG. 7, a method of constructing a structure using at least one connector block is shown. In a step S22, structural elements are connected to the or each connector block 100. These structural elements may be connected to the first location portion 106, the second location portion 108, or the third location portion 110, depending on what orientation the structural elements are required to be positioned. In the case where the connector blocks 100 are as shown in FIGS. 1 and 2, the structural elements are connected via bolts to each connector block 100.

Prior to this step, where attachment elements are used, it may be necessary to connect one or more attachment elements 120 to the connector block 100. There will therefore be an earlier step S20 whereby the attachment elements 120 are connected to the buttress elements 102, 104 of the connector block 100. If the design of the connector block 100 allows, the attachment elements 120 may instead be attached to the connector block 100 after the structural elements have been attached to the attachment elements 120.

Once the structural elements have been attached to the connector blocks 100, it may be desirable to provide one or more walls, a ceiling, or a floor to the structure. In such cases, floor sections 1008, wall sections 1012, or ceiling sections 1016 can then be secured or attached to the structural elements in another step S24.

Referring to FIG. 10, the first location portion 106 and second location portion 108 of the connector 100a are configured at right angles to each other (as are the buttress portions—see FIG. 9) so as to receive first and second structural elements extending at right angles, i.e. the horizontal elements 1006 are angularly spaced by 90 degrees in the horizontal plane.

However, whilst the embodiment in the preceding paragraph is popular due to the prevailing shape of building structures, shown in FIG. 8, it will be appreciated that a connector having buttress elements arranged at other transverse angles to each other (and the other parts of the connector 100a arranged accordingly) permits horizontal elements to be angularly spaced by angles other than 90 degrees in the horizontal plane, for example 120 degrees to join successive horizontal elements and connectors in a hexagonal configuration in plan, or 60 degrees to join successive horizontal elements and connectors in a triangular configuration in plan.

In FIGS. 9 and 10, a second type of connector 900a is shown.

Figure 11:
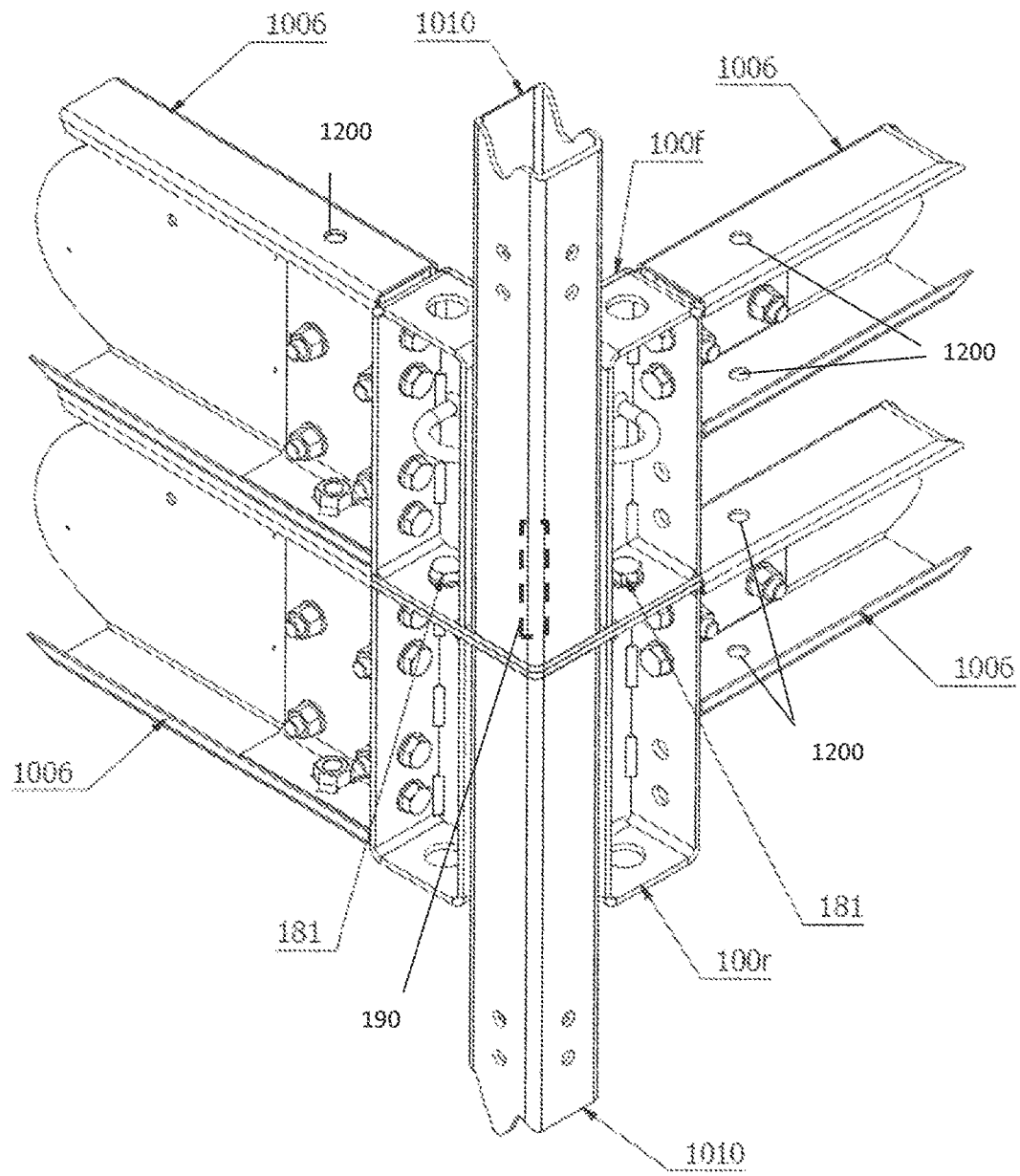
FIG. 11 is a perspective view of a pair of the connectors shown in FIGS. 9 and 10 in a part of a floor and roof assembly, the view in FIG. 11 being analogous to the view in FIG. 4.

One difference between the connector 100a of FIG. 1a and the connector 900a of FIG. 9 is the replacement of two apertures (144 and unreferenced) in the buttress lower wall (for, respectively, fasteners 181 and 180) by a single aperture 144 (for corresponding fastener 181, as seen in FIG. 11). Pin 180 in FIG. 4 provides structural compounding, this is not always essential. Therefore the connector 900a is simplified, and the width of the buttress elements 102, 104 can be reduced. The fastening 181 is still the main vertical robust structural connection for disproportionate collapse (in accordance with Part A of Building Regulations in the United Kingdom). This arrangement also permits a reduction of components by 50%. Having a single fastener 190 (see FIG. 11) connection within each of the third structural elements 1010 and attachment points 136 (shown in FIG. 12) on each connector 900a allows for easier installation in the four connector arrangement as location is required on only four points. A single part 190 which also extends sufficiently vertically to locate both the upper and lower connectors 900a in FIG. 11, and, optionally, the upper and lower vertical bars in FIG. 11, can be envisaged.

The connector 900a forms a more rigid connection between horizontal member 1006 and vertical column member 1010 for use in higher load conditions. The overall length of plate 138 has reduced, which allows a larger format window to be installed in the end elevation and to a higher level (previously the connector 100a restricted the window width), so as to provide additional daylight into the building.

The two apertures (144 and unreferenced) in the buttress upper wall (for, respectively, fasteners 181 and 180) are also replaced by a single (larger) aperture 145. The aperture 145 is used to access the void between 112 and 114. The aperture 145 can be used to insert a tool to facilitate pulling together of each side by side connector 900a, and hence the modules.

Attachment element 120a is U-shaped cross section, it has been stiffened by adding plates at the top and bottom. The upper and lower plates of attachment element 120a each have apertures, providing more connectivity options. This re-distributes forces more evenly from the beam 1006 into the connector block 900a to limit local buckling in the block.

In FIG. 11, a pair of the connectors 900a shown in FIGS. 9 and 10 in a part of a floor and roof assembly, the view in FIG. 11 being analogous to the view in FIG. 4. Each horizontal structural element 1006 comprises an aperture 1200 in an upper surface thereof.

Figure 12:
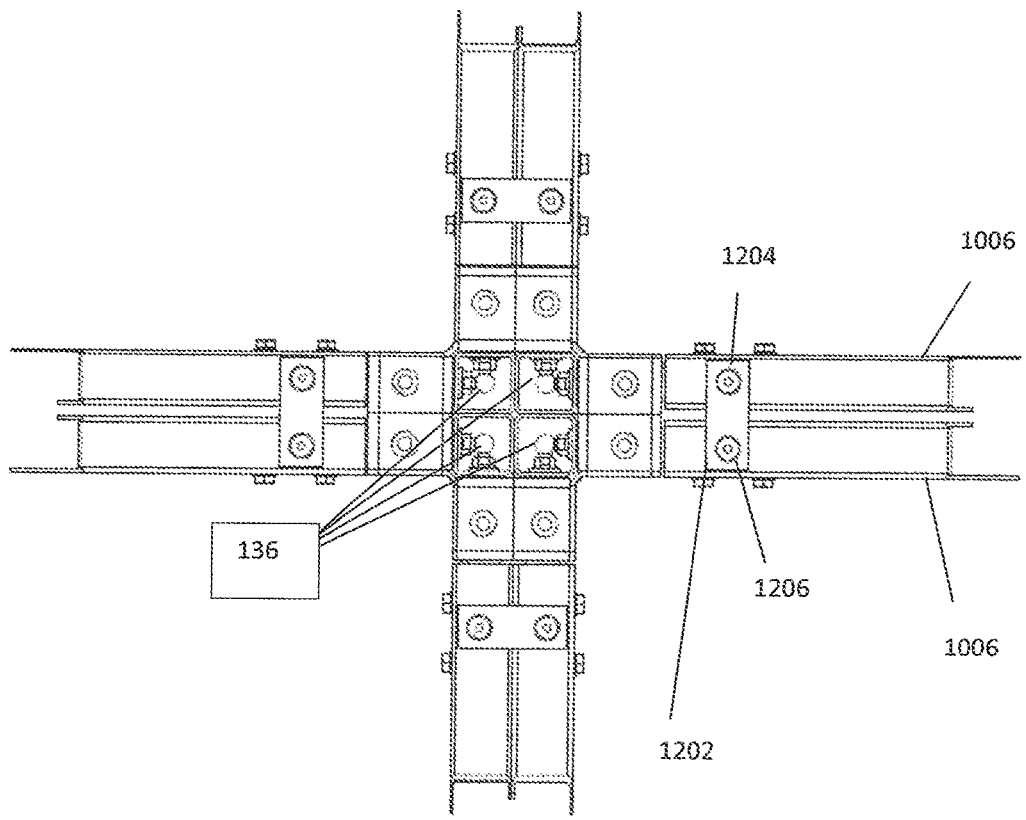
FIG. 12 is a plan view of four connectors shown in FIGS. 9 and 10 in a part of a floor and roof assembly.
Figure 13:
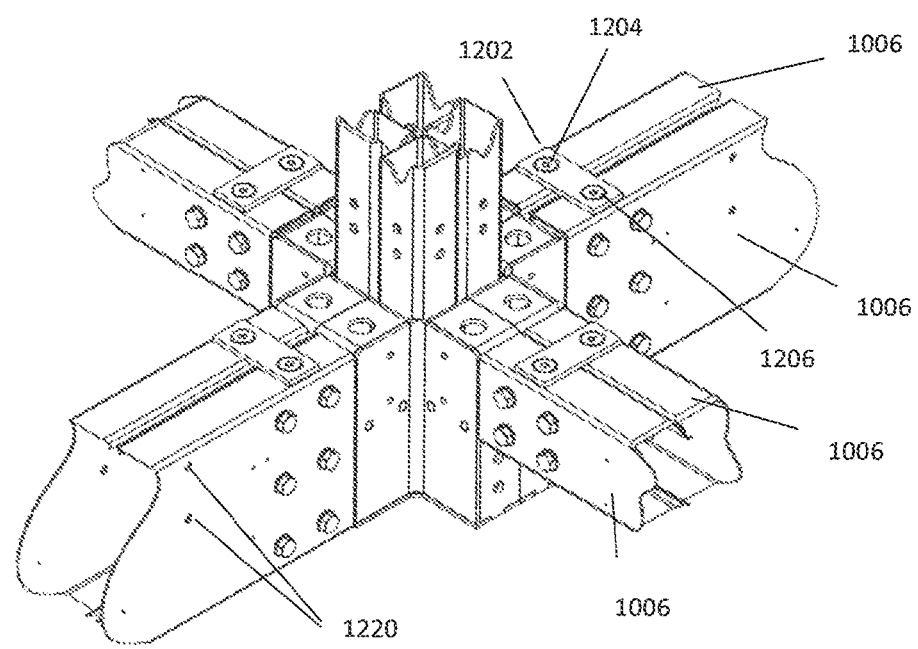
FIG. 13 is a perspective view of the four connectors and part of a floor and roof assembly of FIG. 12.

In FIGS. 12 and 13, four of the connectors 900a shown in FIGS. 9 and 10 are arranged in a part of a floor and roof assembly.

Adjacent connectors can be connected by plates (not shown for conciseness) fastened through adjacent first aperture 144 and second apertures 144.

The tops of adjacent horizontal structural elements 1006 can be connected on site by plates 1202 fastened using countersunk bolts 1204, 1206 through apertures 1200. The plate 1202 also acts as the horizontal robust connection for disproportionate collapse (in accordance with Part A of Building Regulations in the United Kingdom). Further apertures 1200 are provided in the bottom of the horizontal structural elements 1006.

In situations where increased structural rigidity is required, the design of the connector 100a, 900a also allows the positions of attachment element 120a and attachment element 120b to be switched. This means, when a connector 900a is turned through 180° with respect another connector 900a, like the two connectors 900a shown in FIG. 11, this in turn reverses the size of horizontal members 1006 which can be accommodated by the attachment elements 120a, 120b, which means the web of adjacent same sized beams 1006 can be arranged "back to back", allowing installation of a horizontal bolt through apertures 1220 in the web of section 1006, as shown in FIG. 13, thereby improving the combined structural performance of the horizontal structural elements 1006.

Figure 14:
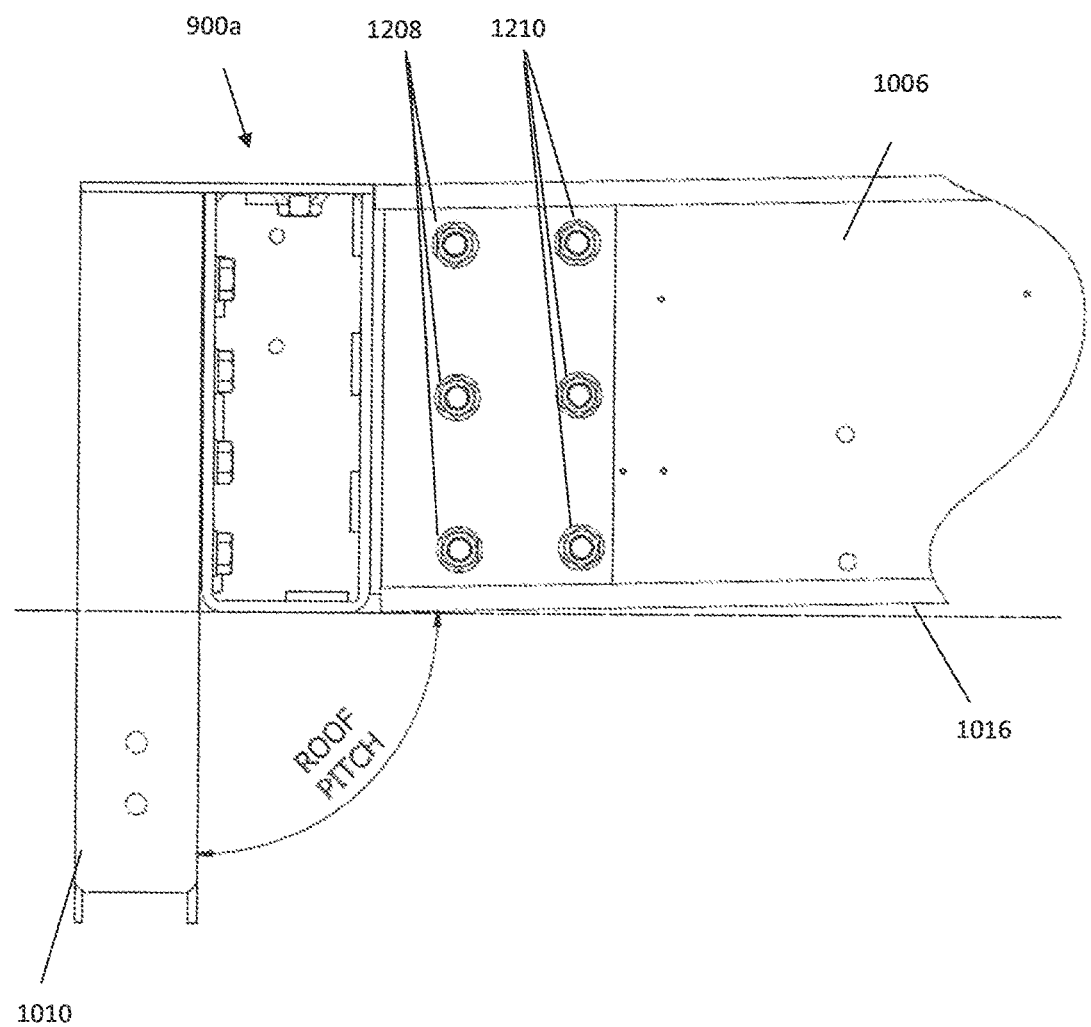
FIG. 14 is a side view of the connector shown in FIG. 9 connected to a first vertical structural element and a second non vertical structural element.

Referring to FIG. 14, the connector 900a can be connected to a first vertical structural element 1010 and a second non-horizontal structural element 1006. This is facilitated by, referring to FIG. 9, arranging the holes in the attachment portion 120a of the second structural element 1006 so that they are not in a vertical line, but offset from a vertical line at an appropriate angle. As a result, the three bolts 1208 are offset from a vertical line at an appropriate angle, and the three bolts 1210 are offset from a vertical line at an appropriate angle. Consequently, a lower surface 1016 of non-horizontal structural element 1006 is inclined to horizontal, represented by dashed line. This offset is variable to account for different roof pitch requirements.

Although the present disclosure has been described with reference to one or more examples, workers skilled in the art will recognize that changes may be made in form and detail without departing from the scope of the disclosure and/or the appended claims.

The invention claimed is:

1. A connector for offsite construction of a portion of a building, comprising:
   a first access and buttress part and a second access and buttress part, wherein the first access and buttress part comprises a first box section, the second access and buttress part comprises a second box section, the first box section has a first plane parallel to ends of the first box section, the second box section has a second plane parallel to ends of the second box section, the first plane of the first box section is transverse to the second plane of the second box section, the first box section comprises a first box section first side wall spaced from and parallel to a first box section second side wall, the second box section comprises a second box section first side wall spaced from and parallel to a second box section second side wall, the first box section and the second box section are arranged so that the first box section second side wall is proximal to the second box section first side wall, the first box section first side wall defines a first location portion, the second box section second side wall defines a second location portion, the first location portion and the second location portion being configured, respectively, to receive first and second structural elements extending at transverse angles to each other;
   a first access space defined between the first box section first side wall and the first box section second side wall for a fastener to be accessed; and
   a second access space defined between the second box section first side wall and the second box section second side wall for a fastener to be accessed,
   the first box section second side wall and the second box section first side wall together partially defining a third location portion configured to receive a third structural element extending transversely to each of the first and second structural elements,
   the third location portion also comprising a third location portion wall extending between the first box section second side wall and the second box section first side wall, the first box section comprising a first box section third side wall and a first box section fourth side wall, which each connect the first box section first side wall and the first box section second side wall, wherein the first box section third side wall and the first box section fourth side wall are perpendicular to the first box section first side wall and the first box section second side wall, the second box section comprises a second box section third side wall and a second box section fourth side wall, which each connect the second box section first side wall and the second box section second side wall, wherein the second box section third side wall and the second box section fourth side wall are perpendicular to the second box section first side wall and the second box section second side wall, and the first box section fourth side wall and the second box section fourth side wall are co-planar with each other and the third location portion wall.

2. The connector block according to claim 1, wherein the connector comprises a plate that forms the first box section fourth side wall, the second box section fourth side and the third location portion wall.

3. The connector according to claim 2, wherein the plate includes an aperture defining a lifting point for the connector.

4. The connector according to claim 1, further comprising at least one attachment element, each attachment element being configured to connect to one of the first access and buttress part and the second access and buttress part in a selected one of two orientations, each attachment element being configured to provide a connection between one of the access and buttress parts and a structural element.

5. The connector according to claim 1, wherein the first and second access and buttress parts include holes for receiving fasteners to connect to attachment elements and/or structural elements.

6. The connector according to claim 1, wherein each of the first box section third side wall and the second box section third side wall is positioned on an interior side of the connector.

7. An assembly for offsite construction of a portion of a building, comprising:
    a plurality of structural elements;
    at least one connector, each of the at least one connector being configured to interconnect respective first and second structural elements of the plurality of structural elements and comprising:
    a first access and buttress part and a second access and buttress part, wherein the first access and buttress part comprises a first box section, the second access and buttress part comprises a second box section, the first box section has a first plane parallel to ends of the first box section, the second box section has a second plane parallel to ends of the second box section, the first plane of the first box section is transverse to the second plane of the second box section, the first box section comprises a first box section first side wall spaced from and parallel to a first box section second side wall, the second box section comprises a second box section first side wall spaced from and parallel to a second box section second side wall, the first box section and the second box section are arranged so that the first box section second side wall is proximal to the second box section first side wall, the first box section first side wall defines a first location portion, the second box section second side wall defines a second location portion, the first location portion and the second location portion being configured, respectively, to receive the first and second structural elements extending at transverse angles to each other;
    a first access space defined between the first box section first side wall and the first box section second side wall for a fastener to be accessed; and
    a second access space defined between the second box section first side wall and the second box section second side wall for a fastener to be accessed,
    the first box section second side wall and the second box section first side wall together partially defining a third location portion configured to receive a third structural element extending transversely to each of the first and second structural elements,
    the third location portion also comprising a third location portion wall extending between the first box section second side wall and the second box section first side wall,
    the first box section comprising a first box section third side wall and a first box section fourth side wall, which each connect the first box section first side wall and the first box section second side wall, wherein the first box section third side wall and the first box section fourth side wall are perpendicular to the first box section first side wall and the first box section second side wall,
    the second box section comprises a second box section third side wall and a second box section fourth side wall, which each connect the second box section first side wall and the second box section second side wall, wherein the second box section third side wall and the second box section fourth side wall are perpendicular to the second box section first side wall and the second box section second side wall, and the first box section fourth side wall and the second box section fourth side wall are co-planar with each other and the third location portion wall.

8. The assembly according to claim 7, further comprising first and second fasteners configured to form a releasable connection between the first and second structural elements and the first and second access and buttress parts, respectively.

9. The assembly according to claim 7, wherein the connector block is manufactured from a plurality of plates.

10. The assembly according to claim 7, wherein the at least one connector comprises four connectors, and the plurality of structural elements comprises four elongate members, and the four elongate members are arranged in a rectangular configuration, and adjacent elongate members are connected via one of the four connectors.

11. The assembly according to claim 10, wherein the assembly is a floor frame part, wall frame part, ceiling frame part, or a roof frame part.

12. The assembly according to claim 7, further comprising at least one floor portion, ceiling portion, wall portion and/or roof portion that connects to the structural elements to form a floor, ceiling, wall and/or roof, respectively.

13. A method of manufacturing a connector for offsite construction of a portion of a building, the method comprising:
    forming a first access and buttress part and a second access and buttress part from a plurality of plates that engage together,
    wherein the first access and buttress part comprises a first box section, the second access and buttress part comprises a second box section, the first box section has a first plane parallel to ends of the first box section, the second box section has a second plane parallel to ends of the second box section, the first plane of the first box section is transverse to the second plane of the second box section, the first box section comprises a first box section first side wall spaced from and parallel to a first box section second side wall, the second box section comprises a second box section first side wall spaced from and parallel to a second box section second side wall, the first box section and the second box section are arranged so that the first box section second side wall is proximal to the second box section first side wall, the first box section first side wall defines a first location portion, the second box section second side wall defines a second location portion, the first location portion and the second location portion being configured, respectively, to receive first and second structural elements extending at transverse angles to each other;
- a first access space defined between the first box section first side wall and the first box section second side wall them for a fastener to be accessed; and
- a second access space defined between the second box section first side wall and the second box section second side wall for a fastener to be accessed,
- the first box section second side wall and the second box section first side wall together partially defining a third location portion configured to receive a third structural element extending transversely to each of the first and second structural elements,
- the third location portion also comprising a third location portion wall extending between the first box section second side wall and the second box section first side wall,
- the first box section comprising a first box section third side wall and a first box section fourth side wall, which each connect the first box section first side wall and the first box section second side wall, wherein the first box section third side wall and the first box section fourth side wall are perpendicular to the first box section first side wall and the first box section second side wall,
- the second box section comprises a second box section third side wall and a second box section fourth side wall, which each connect the second box section first side wall and the second box section second side wall, wherein the second box section third side wall and the second box section fourth side wall are perpendicular to the second box section first side wall and the second box section second side wall, and the first box section fourth side wall and the second box section fourth side wall are co-planar with each other and the third location portion wall.

14. The method according to claim 13, comprising engaging the plates together using mortise and tenon joints.

15. The method according to claim 13, further comprising welding the plates together.

16. A method of constructing a structure, the method comprising:
- connecting a plurality of structural elements together using at least one connector, each of the at least one connector connecting respective first and second structural elements of the plurality of structural elements and comprising:
- a first access and buttress part and a second access and buttress part, wherein the first access and buttress part comprises a first box section, the second access and buttress part comprises a second box section, the first box section has a first plane parallel to ends of the first box section, the second box section has a second plane parallel to ends of the second box section, the first plane of the first box section is transverse to the second plane of the second box section, the first box section comprises a first box section first side wall spaced from and parallel to a first box section second side wall, the second box section comprises a second box section first side wall spaced from and parallel to a second box section second side wall, the first box section and the second box section are arranged so that the first box section second side wall is proximal to the second box section first side wall, the first box section first side wall defines a first location portion, the second box section second side wall defines a second location portion, the first location portion and the second location portion being configured, respectively, to receive the first and second structural elements extending at transverse angles to each other;
- a first access space defined between the first box section first side wall and the first box section second side wall for a fastener to be accessed; and
- a second access space defined between the second box section first side wall and the second box section second side wall for a fastener to be accessed,
- the first box section second side wall and the second box section first side wall together partially defining a third location portion configured to receive a third structural element extending transversely to each of the first and second structural elements,
- the third location portion also comprising a third location portion wall extending between the first box section second side wall and the second box section first side wall,
- the first box section comprising a first box section third side wall and a first box section fourth side wall, which each connect the first box section first side wall and the first box section second side wall, wherein the first box section third side wall and the first box section fourth side wall are perpendicular to the first box section first side wall and the first box section second side wall,
- the second box section comprises a second box section third side wall and a second box section fourth side wall, which each connect the second box section first side wall and the second box section second side wall, wherein the second box section third side wall and the second box section fourth side wall are perpendicular to the second box section first side wall and the second box section second side wall, and the first box section fourth side wall and the second box section fourth side wall are co-planar with each other and the third location portion wall.

17. The method according to claim 16, wherein the method comprises, prior to connecting the first and second structural elements, connecting an attachment element to at least one of the first or second access and buttress part of the at least one connector, the attachment element connecting to the first or second structural element.

18. The method according to claim 16, further comprising connecting at least one floor portion, wall portion, ceiling or roof portion using the at least one connector, to form a floor, wall, ceiling or roof, respectively.

19. The method of claim 16, wherein the at least one connector comprises four connectors, and the plurality of structural elements comprises four elongate members, and adjacent elongate members are connected via one of the four connectors, and wherein the method comprises:
- arranging the four elongate members in a rectangular configuration;
- arranging one of the four connectors at each junction between ends of adjacent elongate members; and connecting the ends of adjacent elongate members of the four elongate members via each of the connectors, so as to make a structure.

\* \* \* \* \*